(12) United States Patent
Czajkowski et al.

(10) Patent No.: US 8,973,008 B2
(45) Date of Patent: Mar. 3, 2015

(54) COMBINING DIFFERENT RESOURCE TYPES

(75) Inventors: Grzegorz J. Czajkowski, Mountain View, CA (US); Glenn C. Skinner, Palo Alto, CA (US); Laurent P. Daynès, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 2513 days.

(21) Appl. No.: 11/125,579

(22) Filed: May 10, 2005

(65) Prior Publication Data

US 2006/0259906 A1    Nov. 16, 2006

(51) Int. Cl.
*G06F 9/46* (2006.01)
*G06F 15/173* (2006.01)
*G06F 9/50* (2006.01)

(52) U.S. Cl.
CPC ............ *G06F 9/5077* (2013.01); *G06F 9/5011* (2013.01)
USPC .......................................... 718/104; 709/226

(58) Field of Classification Search
CPC .................................................... G06F 9/5011
USPC .......................................... 718/104; 709/226
See application file for complete search history.

(56) References Cited

U.S. PATENT DOCUMENTS

| | | | | |
|---|---|---|---|---|
| 6,415,333 | B1 * | 7/2002 | Vasell | 719/315 |
| 6,957,211 | B1 * | 10/2005 | Tyulenev et al. | 707/718 |
| 7,640,547 | B2 * | 12/2009 | Neiman et al. | 718/104 |
| 2005/0149939 | A1 * | 7/2005 | Noeske et al. | 718/104 |

OTHER PUBLICATIONS

Baurav Banga, Peter Druschel, Jeffrey C. Mogul, Resource Containers: A new facility for resource management in server systems, 1999, USENIX Association, Third Symposium on Operating System Design and Implemenation, OSDI, pp. 45-58.*

Andersson, J., et al., "Kaffemik—A distributed JVM on a single address space architecture," 4th International Conference on SCI-based Technology and Research, Dublin, Ireland, Oct. 1-3, 2001, 9 pages.

Antoniu, Gabriel, et al., "The Hyperion system: Compiling multithreaded Java bytecode for distributed execution," Parallel Computing, vol. 27, No. 10, 2001, pp. 1279-1297.

Aron, Mohit, et al., "Cluster Reserves: A Mechanism for Resource Management in Cluster-based Network Servers," Proceedings of the ACM Sigmetrics International Conference on Measurement and Modeling of Computer Systems, Santa Clara, CA, Jun. 2000, 12 pages.

Aridor, Yariv, et al., "cJVM: a Single System Image of a JVM on a Cluster," International Conference on Parallel Processing, Fukushima, Japan, Sep. 1999, 8 pages.

(Continued)

*Primary Examiner* — Camquy Truong

(74) *Attorney, Agent, or Firm* — Robert C. Kowert; Meyertons, Hood, Kivlin, Kowert & Goetzel, P.C.

(57) ABSTRACT

Combining different resource types into a single logical resource can provide a perspective more suitable for managing a given computer program. Resources of different types that have similar characteristics are combined as a single resource type. Resource management policies are applied against the different resource types via the single combination resource type, wherein on a single computer or applied against a cluster of computers.

21 Claims, 6 Drawing Sheets

(56) References Cited

OTHER PUBLICATIONS

Ban, Bela "JGroups—A Toolkit for Reliable Multicast Communication," downloaded from <jgroups.org/javagroupsnew/docs/index.html on Jul. 28, 2005> 2 pages.

Czajkowski, Grzegorz, et al., "A Resource Management Interface for the Java™ Platform," Sun Microsystems Laboratories Technical Report 2003-124, May 2003, 17 pages.

Czajkowski, Grzegorz, "JSR121: Application Isolation API Specification," Dec. 19, 2002, 6 pages, downloaded from <//web1.jcp.org/en/jsr/detail?id=121 on Jun. 20, 2005>.

Czajkowski, Grzegorz, et al., "Multitasking without Compromise: a Virtual Machine Evolution," 17th ACM OOPSLA'01, Tampa, FL, Oct. 2001, 14 pages.

Factor, Michael, et al., "A Distributed Runtime for Java: Yesterday and Today," Proceedings of the 18th International Parallel and Distributed Processing Symposium (IPDPS '04), Santa Fe, NM, Apr. 2004, 7 pages.

Foster, Ian, et al. (editors), *The Grid: Blueprint for a New Computing Infrastructure*, 2nd Edition, Morgan Kaufmann, Boston, MA, 2003, pp. 259-318.

Geist, Al, et al., *PVM: Parallel Virtual Machine*, MIT Press, Cambridge, MA, Nov. 1994, pp. 101-110, 125-126.

Jordan, Mick, et al., "Extending a J2EE™ Server with Dynamic and Flexible Resource Management," ACM/IFIP/USENIX Middleware Conference, Toronto, ON, Oct. 2004, 20 pages.

Message Passing Interface Forum (MPIF), "MPI: A Message-Passing Interface Standard," Technical Report UT-CS-94-230, University of Tennessee, May 1994, 228 pages.

Philippsen, Michael, et al., "JavaParty—Transparent Remote Objects in Java," Concurrency: Practice and Experience, vol. 9, No. 11, Nov. 1997, pp. 1225-1242.

Tilevich, Eli, et al., "J-Orchestra: Automatic Java Application Partitioning," 16th European Conference on Object-Oriented Programming (ECOOP), LNCS 2374, Malaga, Spain, Jun. 10-14, 2002, pp. 178-204.

Yu, Weimin, et al., "Java/DSM: A platform for heterogeneous computing," Concurrency: Practice and Experience, vol. 9, No. 11, Nov. 1997, pp. 1213-1224.

Zhu, Wenzhang, et al., "JESSICA2: A Distributed Java Virtual Machine with Transparent Thread Migration Support," Cluster 2002: IEEE International Conference on Cluster Computing, Chicago, IL, Sep. 2002, 8 pages.

\* cited by examiner

COMBINING DIFFERENT RESOURCE TYPES

BACKGROUND

The present invention relates to the field of computers. More specifically, the present invention relates to resource management.

Software engineering considerations, data protection, multi-vendor development, the availability of extensible execution environments, and other factors have been causing a shift in software development from large, monolithic applications to application component federations. To date, most research and commercial operating systems work has focused on managing resources available to a single application only, or to a group of applications connected by the parent-child relationship. Increasingly, there is a need for mechanisms that enable defining resource policies applicable to arbitrarily grouped collections of components.

For instance, enterprise applications are increasingly being built using type-safe programming platforms and deployed over horizontally scalable systems. Crucial to horizontal scalability is the ability to monitor resource usage and to define and enforce resource management policies capable of guaranteeing a desired service level. However, current safe language platforms have very limited support for resource management, and their cluster-enabled versions reflect this deficiency. The end result is that resource management capabilities typically reduce to coarse grained management of a single resource.

Such a lack of flexibility in resource management reduces the utility of resource managers. For example, a conventional resource manager manages disk traffic separately from network traffic. Such resource managers do not possess the capability to manage the two independent resources as a single resource, which may be especially useful to more abstractly manage resources in a cluster or resources on a single computer system that has componentized application(s). This shortcoming of resource management limits extensibility of policy expression in both a single computer system and in a computer cluster system.

Cluster computing aims at capturing the promise of horizontal scalability offered by interconnected computers. Safe languages, in conjunction with their associated component architectures, such as the Java® 2 Enterprise Environment (J2EE®) architecture and .NET's managed components, address the problem of the development of portable, multi-component applications. Numerous designs of the Java Virtual Machine (JVM®) virtual machine enhanced for cluster computing reflect the importance of both safe language platforms and clusters of computers. However, all of these system designs have at least one of the following shortcomings: (i) lack of a well-defined container mechanism with guarantees strong enough to enable effective performance isolation for cluster applications, (ii) only coarse grained of resource management (e.g., in the case of the CPU time, granularities often are the number of processors, computers, or whole-machine load), (iii) only mono-resource management (typically only CPU time), and/or (iv) ability to monitor only, without control exercising capabilities. To a large extent, these deficiencies follow from weak support for resource management, especially for defining and enforcing resource consumption policies, in the Java platform. However, the deficiencies are also present in many cluster programming environments not based on safe languages.

Although some of these deficiencies may not seem substantial in current applications, failing to address the shortcomings ignores trends in computing. Coarse granularity may be sufficient in specialized settings (e.g., long-running, CPU-intensive tasks), but leads to inefficiencies when considered in conjunction with a trend toward applications consisting of a dynamic population of components that vary in their resource needs and lifetimes. Resource management oriented towards controlling processor usage is applicable to CPU-bound applications, but is inadequate in situations where using network, databases, or memory dominates. Overall, current cluster programming systems based on safe languages offer scant information on resource consumption and only rudimentary mechanisms for controlling a small set of resources. These limitations constrain what can be done with respect to load-balancing and service provisioning. As clusters of computers become a more significant part of the modern computing landscape, the need for resource management policy defining mechanisms that apply equally well to both a single computer and clusters of computers becomes more prominent.

SUMMARY OF THE INVENTION

It has been discovered that combining different types of resources extends resource management policy expression. Different types of resources, such as the amount of data sent either to a file system or over the network can be managed as a single resource in accordance with a policy that applies to consumption of both resources. A resource domain can be defined for the combination of data sent to a file system (e.g., FileSystemTraffic) and data sent over a network (e.g., NetworkTraffic). A policy may express that a given amount of this combination resource (e.g., FileSystemOrNetworkTraffic) is reserved for a given isolate. The policy may also express that consumption by particular isolates is to be limited. Whenever an isolate bound to the domain defined for the aggregation of the two resources consumes either of the resources, the domain is charged with that consumption. For example, if there are 30 available units of FileSystemOrNetworkTraffic and an isolate consumes 2 units of NetworkTraffic and 3 units of FileSystemTraffic, then the domain will be charged for aggregate consumption of 5 units of FileSystemOrNetworkTraffic.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 2A depicts exemplary communications from isolates to a cluster-global dispenser. FIG. 2B depicts subsequent replies from the cluster-global dispenser.

FIG. 3A depicts exemplary initiating of a cluster-global policy and binding of isolates in a cluster to the policy. FIG. 3B depicts interaction between nodes to process consume requests.

FIG. 5A depicts an exemplary system with a combination resource domain. FIG. 5B depicts exemplary systems with a cluster-global resource domain for a combination resource.

The use of the same reference symbols in different drawings indicates similar or identical items.

DESCRIPTION OF EMBODIMENT(S)

Figure 1:
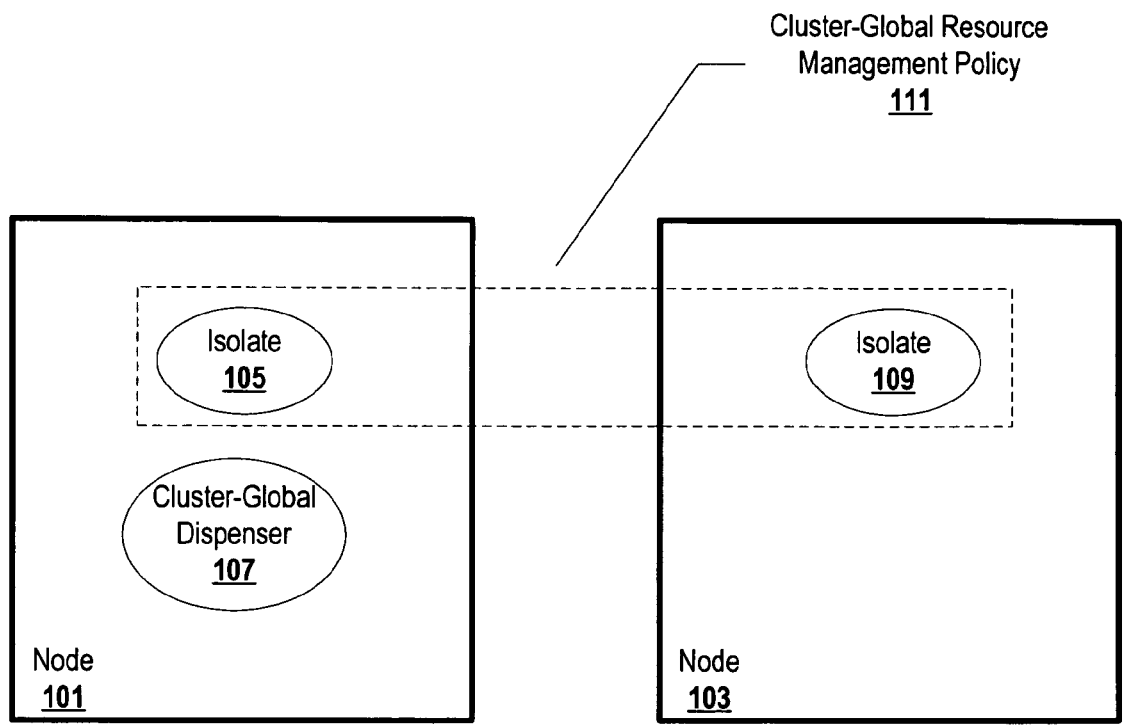
FIG. 1 depicts an exemplary cluster with a cluster-global dispenser. A node 101 and a node 103 are networked together as a cluster.

The description that follows includes exemplary systems, methods, techniques, instruction sequences and computer program products that embody techniques of the present invention. However, it is understood that the described invention may be practiced without these specific details. For instance, reference is made to the Java programming language and JVM virtual machines to describe the invention. Although other virtual machines and programming languages can be utilized to realize the described invention, the exemplary illustrations and code refers to the Java programming language to aid in understanding the described invention. In other instances, well-known protocols, structures and techniques have not been shown in detail in order not to obscure the invention.

Overview of Isolates and Resource Management Interface Framework

The following description uses several terms to describe the invention. These terms include computation, resource, isolate, and resource management policy. A computation is one or more executing pieces of code that cause one or more tasks to be performed. Computations include entities that occupy an address space in system memory (e.g., processes, threads, applications, etc.). A resource is a measurable entity that one or more computations consume. Availability of a resource impacts performance, such that a shortfall may negatively affect performance and an abundance may improve performance. Conventional examples of resources include heap memory, the number of database connections or server threads in use, and processor time.

Isolates

An isolate is one or more computations that do not share state or objects with other computations (i.e., the computations are encapsulated). Hence, isolates do not share objects or state with other isolates. The described invention utilizes isolates as a unit of management. A resource management policy defines guidelines for consuming or unconsuming a resource, such as availability of a resource for computations requesting the resource. Within a specific exemplary context of the Java programming language, an isolate is a container for executing arbitrary applications written for the Java platform that provides the same guarantees of execution as those provided by executing an application with a Java Virtual Machine (JVM) virtual machine. Since isolates do not share state among one another, each consumed resource has precisely one owner. Owing to this property, isolates can be asynchronously terminated and their resources cleanly reclaimed. Isolates communicate via data-copying mechanisms (sockets, resource management interface, etc.). Java Specification Request 121 entitled "Application Isolation API Specification" provides an exemplary guideline for implementation of an isolate. Isolate creation and life cycle management are the subject of the Application Isolation API ("Isolate API"), the formal output of JSR-121. The Isolate API is fully compatible with existing applications and middleware. In particular, applications that pre-date JSR121 may be managed by the API without modification.

Programming with isolates bears similarities to programming with threads. Launching a new isolated computation amounts to specifying a main class and arguments, and invoking a start method. The following is exemplary code for launching a new isolate:

```
Isolate i = new Isolate("tests.Hello", new String[ ] { });
    i.start( );
```

Resource Management Interface

A resource management interface includes mechanisms to express resource management policies and abstractions of resource implementations. An exemplary resource management may include mechanisms and abstractions such as resource domains and resource characterizations. Policy mechanisms include reservations, constraints, and notifications. A resource management interface can be extensible, such as allowing new resource types that can be defined to better reflect the requirements of a given application. Although in many scenarios "traditional" resources such as CPU time, heap memory, or amount of data transferred over the network sufficiently characterize an application's requirements, there are cases where managing different resources offers more insight and abstracts away irrelevant details. For example, controlling the number of SQL statements can be more useful than direct management of underlying lower-level resources.

Applications that need to control how resources are partitioned (e.g., application servers) can use the API for that purpose. Pro-active programs can use the API to learn about resource availability and consumption to improve the characteristics most important to them (response time, throughput, footprint, etc.) or to ward off denial of service attacks. One of the abstractions of a resource management interface is a resource domain, which encapsulates a usage policy for a resource. All isolates bound to a given resource domain are uniformly subject to that domain's policy for the underlying resource. An isolate cannot be bound to more than one domain for the same resource, but can be bound to many domains for different resources. Thus, two isolates can share a single resource domain for, say, CPU time, but be bound to distinct domains for outgoing socket traffic.

The resource management API does not itself impose any policy on a domain; policies are explicitly defined by programs. A resource management policy for a resource controls when a computation may gain access to, or consume, a unit of that resource. The policy may specify reservations and arbitrary consume actions that should execute when a request to consume a given quantity of resource is made by an isolate bound to a resource domain. Consume actions that are defined to execute prior to the consuming act as programmable constraints and can influence whether or not the request is granted. Consume actions defined to execute after the consume event can be thought of as notifications.

This slightly simplified exemplary code shows how to create a domain for heap memory, with 32 MB reserved, with a constraint that limits the use to no more than 32 MB, and with a notification that gets triggered when the usage exceeds 30 MB.

```
heapDomain1 = ResourceDomain.newDomain(HEAP_MEM);
heapDomain1.setReservation(32 * MEGABYTE);
heapDomain1.setConsumeAction(new Constraint( ) {
    public boolean consume(long previous, long proposed) {
        return (proposed <= 32 * MEGABYTE);
```

-continued

```
    }});
    heapDomain1.setConsumeAction(new Notification( ) {
        public void consumed(long previous, long current) {
            if (current> 30 * MEGABYTE)
                warn("Close to heap mem limit! Now using " +
current);
    }});
```

The implementation of resources used by programs strictly encapsulates all interactions with the resource management API. Thus, when requesting a resource (e.g., opening a socket, etc.), clients are oblivious to the existence of the resource management interface, and can be run under a particular resource management policy without any change to their code. Failures related to the enforcement of a particular policy are reported to the application as exceptions described in the resource's documentation.

A dispenser is an intermediate computation(s) that handles resource requests and that allows for monitoring and control of resource consumption separate from an operating system environment. Most cluster programs can utilize a global and/or local dispenser, as it naturally applies to the cluster case, and the platform takes care of placement of new isolates. However, cluster-global dispensers are employed for code such as load-balancers, application managers, or applications that have very specific needs. Such applications may need to control or monitor resource usage at a cluster-global scale, regardless of whether a resource has single source of production or multiple sources of production.

Cluster-Global Dispenser

The described invention allows an architecture for cluster computing in the Java platform. Resource consumption of tasks whose components span multiple computers can be monitored and controlled from any node. Performance of applications can be isolated from one another and within an application its components can execute under different policies. The architecture is backward-compatible (existing code can run unmodified). The infrastructure is well-suited for the execution of enterprise multi-component applications over cluster architectures. Rather than statically dedicating a subset of the nodes of the cluster to each of the applications, it is possible to express multi-application, cluster-global policies and enforce them via the resource management API. Load-balancers and application managers may need to directly control the distribution of isolates and to globally coordinate their node-local resource policies. A simple example is a policy that manages five applications on three nodes in such a way that, regardless of how many components (if any) of an application execute on a given node, the application gets its equal share of CPU and network resource of that node, and each application gets at most ⅕ of main memory available on all nodes.

FIG. 1 depicts an exemplary cluster with a cluster-global dispenser. A node 101 and a node 103 are networked together as a cluster. Node 101 hosts an isolate 105 and node 103 hosts an isolate 109. There is only one dispenser within the cluster. Node 101 hosts a cluster-global dispenser, which is the only dispenser within the cluster. Although other configurations are possible and will be discussed later, FIG. 1 is limited to depicting a single cluster-global dispenser to avoid any possible confusion. In addition, a resource management policy 111, which spans both nodes 101 and 103, is applied to the isolates 105 and 109. The resource management policy 111 is a logical representation of a policy. Association of a cluster-global policy may be implemented in a variety of ways, of which a few are enumerated below. The cluster-global dispenser 109 facilitates flexible application of a management policies to resources over nodes of a cluster within the framework of a resource management interface. The cluster-global dispenser 109 coupled with cluster-global policies allows for resource management from the perspective of the entire cluster, which allows for expression of new cluster-type resource management policies.

Figure 2A:
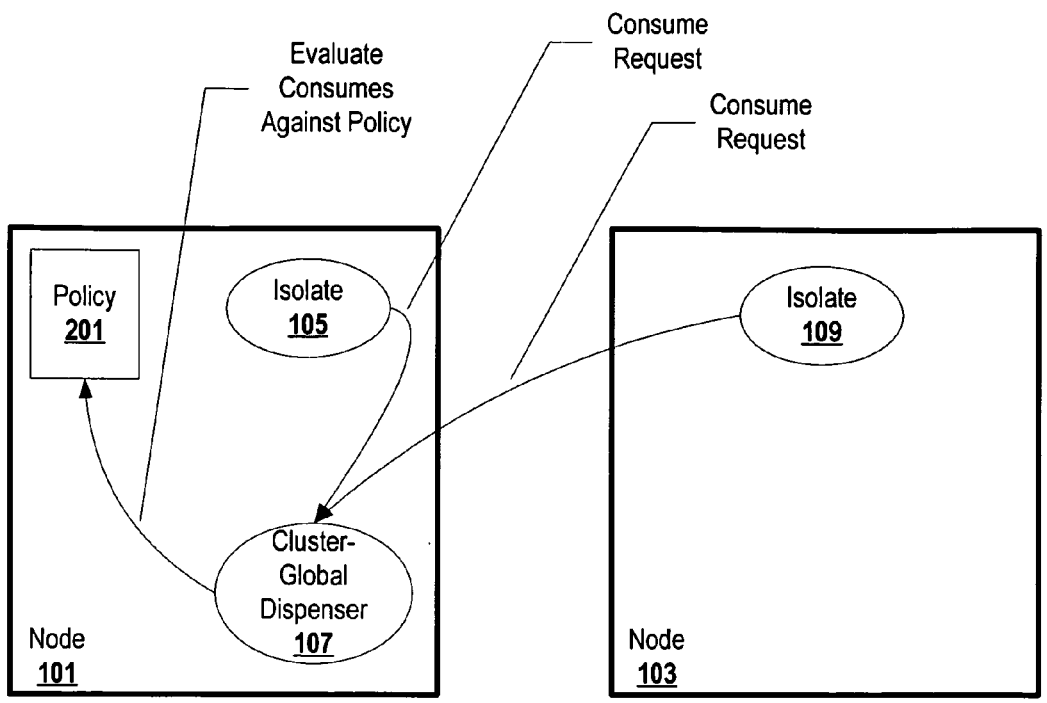
FIGS. 2A-2B depict exemplary operation of a cluster-global dispenser.
Figure 2B:
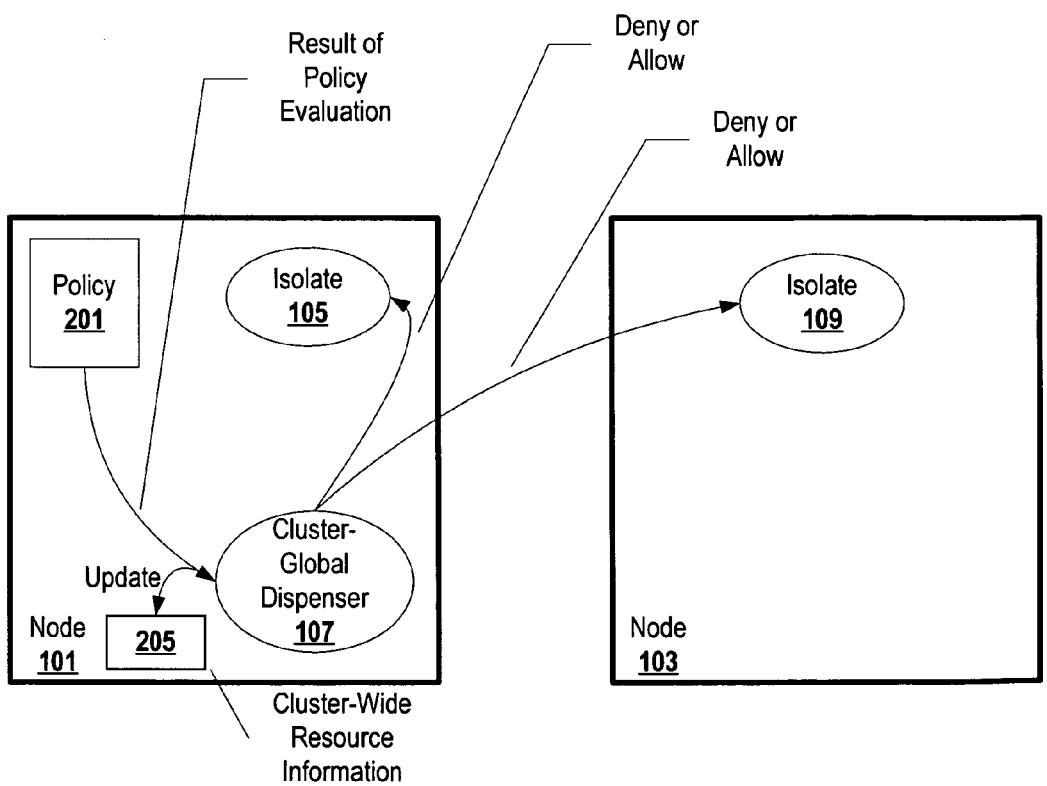

FIGS. 2A-2B depict exemplary operation of a cluster-global dispenser. FIG. 2A depicts exemplary communications from isolates to a cluster-global dispenser. In FIG. 2A, the nodes 101 and 103 respectively host the isolates 105 and 109, previously depicted in FIG. 1. Also, node 101 hosts the cluster-global dispenser 107. Instead of a logical representation, FIG. 2 depicts the cluster-global resource management policy 111 as a policy 201. The policy 201 may be instantiated on both nodes, as a proxy policy on the node 103. In FIG. 2, the policy is depicted as only residing on the node 101. Hence, communications pass between the nodes 101 and 103 to associate the isolate 109 with the policy 201. The cluster-global dispenser 107 has been associated with the policy 201 (e.g., registered with a resource domain that encapsulates the policy 201). The association between the policy 201 and the cluster-global dispenser 107 either explicitly or implicitly identifies the cluster-global dispenser 107 to both isolates 105 and 109. When consume requests are transmitted for the isolates 105 and 109, respective consume requests are generated and communicated to the cluster global dispenser 107. The cluster-global dispenser 107 then evaluates the resource requests against the policy 211.

FIG. 2B depicts subsequent replies from the cluster-global dispenser. Results of the policy evaluation are used by the cluster-global dispenser 107 to update cluster-global resource information 205 resident on the node 101. This information 205 is maintained as bookkeeping for the consumed resource to reflect various statistics, such as availability and consumption, of the resource over the cluster. The information may be maintained separately by the cluster-global dispenser 107, as part of a resource domain, etc. The cluster-global dispenser 107 then either indicates denial or allowance of the consume requests to the respective isolates 105 and 109.

Figures 3A, 3B:
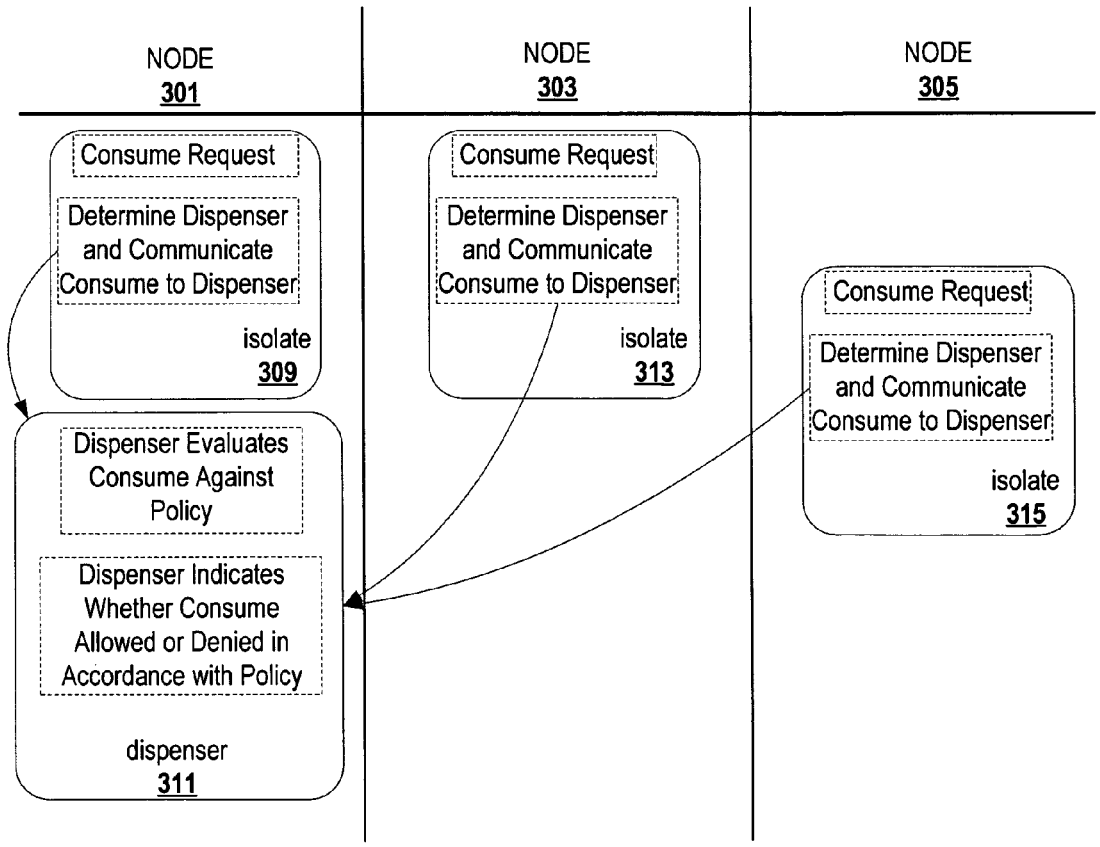
FIGS. 3A-3B depict initiation of a cluster-global policy and interaction between nodes.

FIGS. 3A-3B depict initiation of a cluster-global policy and interaction between nodes. FIG. 3A depicts exemplary initiating of a cluster-global policy and binding of isolates in a cluster to the policy. A cluster includes nodes 301, 303, and 305. At each of the nodes, a resource A is characterized as cluster-managed. At node 301, a cluster-global policy is defined for resource A. The policy may be replicated and maintained at the other nodes 303 and 305, a proxy for the policy may be instantiated at the nodes 303, and 305, etc. After defining the policy, isolates at each of the nodes 301, 303, and 305, are bound to the defined cluster-global policy. At node 301, a cluster-global dispenser is instantiated and associated with the cluster-global policy. The cluster-global dispenser, as with node-local dispensers, is transparent to most applications. Typically, only middleware, the runtime environment (e.g., Java Runtime Environment), or applications defining their own resources would explicitly create dispensers and interact with them.

FIG. 3B depicts interaction between nodes to process consume requests. At node 301, a consume request is submitted for an isolate 309, which is resident in the node 301. Responsive to execution of the consume request, the isolate 309 determines a dispenser and communicates the consume request to the determined dispenser. The determined dispenser is a cluster-global dispenser 311, resident on the node 301. The dispenser 311 evaluates the consume request from the isolate 309 against the previously defined cluster-global policy. The dispenser 311 then indicates whether the consume is allowed or denied in accordance with the policy. The nodes 301 and 303 respectively host isolates 313 and 315. Each of the isolates 313 and 315 also has a consume request submitted, determines the identity of the dispenser associated with the policy to which they are bound, and communicates the consume to the dispenser 311. As already stated, the identity of the dispenser 311 has already been associated with the policy coincident with instantiation of the dispenser. In order for the dispenser 311 to properly communicate allowances or denials of consume requests, the isolates 309, 313, and 315 are identified in their respective consume requests. Within the cluster, each isolate has a unique identifier, which accompanies their consume requests. Numerous techniques can be utilized to uniquely identify the isolates within a cluster.

Cluster-Global Resource Management with an Exemplary Application Programming Interface Framework Although various mechanisms and techniques can be applied to implement a cluster-global dispenser, examples are provided within the context of the aforementioned APIs, which include an Isolate API and a resource management API, to illustrate the described invention.

Identifying Nodes in a Cluster

The ability to identify an isolate within a cluster that hosts numerous isolates is employed to monitor and/or account resource usage on a cluster-global scale. To support cluster computing, the Isolate API can be extended with the notion of an aggregate. An aggregate is a convenient way of naming a cluster node and abstracts away the details of spawning an instance of an isolate-enabled JVM on a specific computer. Aggregates are exposed to programmers as objects whose methods control the life-cycle of an aggregate (creation, activation, and termination), obtaining the current aggregate, and obtaining all known aggregates. The Isolate class can be extended with a method for creating an isolate in a particular aggregate. To provide an example of programming with aggregates the following code fragment starts a new isolate on each aggregate:

```
Aggregate[ ] all = Aggregate.currentAggregates( );
for (int i = 0; i < all.length; i++)
    new Isolate("tests.Hello", new String[0], all[i]).start( );
```

As previously discussed, various techniques may be employed to define cluster-global policies. Illustrating with resource domains, cluster-global policies may be implemented with 1) remote creation of resource domains, or 2) refining resource scope. The following line of code is an example code fragment for remotely instantiating a new resource domain. The code invokes the method for a new resource domain, which identifies an aggregate (i.e., a node within a cluster).

domain=ResourceDomain.newDomain (resourceName, aggregate);

The result is the ability to programmatically control isolate creation and resource policy definition from any place in the cluster, without resorting to writing local proxies that would handle such operations.

To illustrate, when executed on a cluster, each aggregate is implemented as an instance of a multi-tasking virtual machine (MVM). Code written against the exemplary resource management interface will not be aware of the cluster. However, the code will enjoy the benefits of clustering, as MVM provides several load balancing strategies, selected by a start-up time option. Applications that need more control over isolate placement can utilize the exemplary resource management interface. Example applications include custom load-balancers or code that exploits knowledge of the locality that may exist among the isolates that comprise an application (e.g., frequency of inter-isolate communication or accessing resources available on some aggregates only).

Aggregates are created in two ways: (i) indirectly, through a specified load-balancing strategy that creates fresh aggregates, and (ii) directly, either by using the Isolate API or by manually starting a new instance of MVM, which will find the rest of the cluster through a group membership protocol. An exemplary implementation uses JGroups, which is a toolkit for reliable communication written in the Java programming language with a flexible protocol stack architecture. JGroups allows creation of a group or processes whose members can communicate with each other. Upon start-up MVM reads a configuration file that contains the names and attributes of resources to be managed. MVM can tolerate aggregate failures (i.e., the remaining aggregates still function), and delivers lifecycle events. Tolerating failures and delivering lifecycle events allows applications to acquire immediate feedback on failures and to take appropriate actions (e.g., restart the failed isolates in the remaining aggregates, readjust resource usage controls to shed load, gracefully terminate the remaining aggregates, etc.). Due to the group membership protocol, the set of participating aggregates is dynamic.

Refining Resource Scope

The second exemplary technique for implementing cluster-global policies refines the scope of a given resource implementation. Some resources have a source of manufacturing (i.e., implementation) specific to a given node; we call such resources node-local. Examples include CPU time, "manufactured" by processors specifically owned by a given computer, and heap memory, implemented on top of a virtual memory subsystem on a given machine. For node-local resources each node has its own bookkeeping module, such as a dispenser. A dispenser for a node-local resource maintains information about consumption, reservations, constraints, and notifications pertaining to its node only. All domains for a given resource transparently consult the same dispenser before granting the resource. Upon getting a consume request, a dispenser invokes the consume actions set and reports their collective decision back to the requester.

Cluster-managed resources generalize the notion of a single source of manufacture (i.e., the resource's implementation) to the whole cluster. Only one dispenser exists in the cluster for such resources. The cluster-global dispenser maintains accounting information about a resource that is managed on a cluster-global scale ("cluster-managed resource"). Examples of cluster-managed resources include traffic sent on inter-aggregate links and the total number of isolates. They facilitate explicit programmatic control over the combined resource consumption of distributed isolates.

A resource is declared as either cluster-managed or node-managed. For node-managed resources, a binding of an isolate to a domain for such a resource will succeed if the isolate is created (locally or remotely) on a node where the resource's dispenser executes. Domains for cluster-managed resources have cluster-global scope, and any isolate can be bound to such a domain, regardless of where the isolate executes. Referring to FIGS. 3A-3B, the resource A is defined as cluster-managed, which allows the isolates 313 and 315 to be bound to the policy defined at node 301. The notions of node-managed and cluster-managed resources enable creation of application-specific resource management policies that span node boundaries.

After creation, cluster-global domains are used in the same way as the node-local domains. The exemplary resource management for managing resources on a cluster-global scale adds an ability to query a given aggregate for its resource consumption and availability. This functionality parallels queries that can be issued against a specific resource domain. For example, a load balancer may need to verify that an aggregate has at least 1 GB of heap memory available for a memory-intensive program:

```
long inUse = aggregate.getUsage(HEAP_MEM);
long total = aggregate.getTotalQuantity(HEAP_MEM);
return 1 * GB <= total - InUse;
```

Cluster-Global Resource Management Policies

Cluster-global resource management policies provide control or management of a variety of resources in a cluster of nodes. For example, cluster-global resource management policies are useful in controlling the number of nodes a given application executes on or the number of isolates it has spawned, as the scope of these resources is inherently cluster-global. To see the more general utility of cluster-global policies, consider a two-component application, consisting of isolates A and B. Referring to FIG. 1, isolate A is isolate 105 and isolate B is isolate 109. Further, suppose that network traffic is deployed as a node-local resource.

On a single node it is easy to control the combined usage of the network by both isolates. The isolates 105 and 109 would be bound to the same resource domain for the resource on the same node. When the application is deployed on a cluster, with each component residing on a different node, without a cluster-global resource management policy, the mutually remote isolates 105 and 109 could not be bound to a same resource management policy since the resource is node-local. Thus isolates 105 and 109 would be subject to separate policies and there would be no correlation between the two policies unless explicitly programmed. Maintaining the accumulated count of usage of both components would require a custom application-level protocol.

Characterizing the outgoing network traffic resource as cluster-global instead of node-local allows for global control of the resource. Since the resource is now a cluster-global resource, the total usage by a given group of isolates can be controlled, regardless of how many nodes the groups spans, even though there may be multiple sources of manufacture of the resource (e.g., each node has its own network card). Hence, isolates 105 and 109 are bound to a cluster-global resource domain for the cluster-global resource network-traffic. Replacement of a collection of node-local domains with a single cluster-global resource domain allows for expression of various policies. For example, a cluster-global resource management policy may express "the components of the application should never collectively exceed 1 MB/s of out-bandwidth."

Although monitoring cluster-global resource usage can be performed with 1) a cluster-global dispenser, 2) characterization of a resource as cluster-managed, and 3) cluster-global policies, additional flexibility and efficiency can be achieved with techniques that characterize resources differently. Providing a dual-view of a resource preserves the control achieved with local dispensers as well as allowing the cluster-global monitoring and accounting capabilities already discussed. In addition, combining different resource types further enhances resource management within a cluster.

Dual-View of a Resource

Logically viewing a resource as two distinct resources (a cluster-global resource and a node-local resource) provides both node-local and cluster-global control of the resource. When a node-local resource is turned into a cluster-global one, expressing global policies becomes relatively easy, but individual nodes lose the ability to control the resource locally. For example, it is difficult to express a policy such as the following: "no component executing on this node can get more than 0.5 MB/s of out-bandwidth". A related issue is that a policy that governs a resource on a global basis cannot detect shortages of resources locally, which can lead to a severely mis-balanced load.

To address these issues a resource management API allows each resource to be viewed in both ways: as node-local and as cluster-global. Thus, each resource can be exposed through the resource management API as two resource types. For example, the resource NetworkTraffic may be exposed as ClusterGlobalNetworkTraffic and Node-LocalNetworkTraffic. Physically, there is only one source of manufacture for the resource on any given node, but from the application perspective there are two distinct resources. Each instance of the resource is controlled by its own consumption policy, possibly independent from the policy that controls the other.

Figure 4:
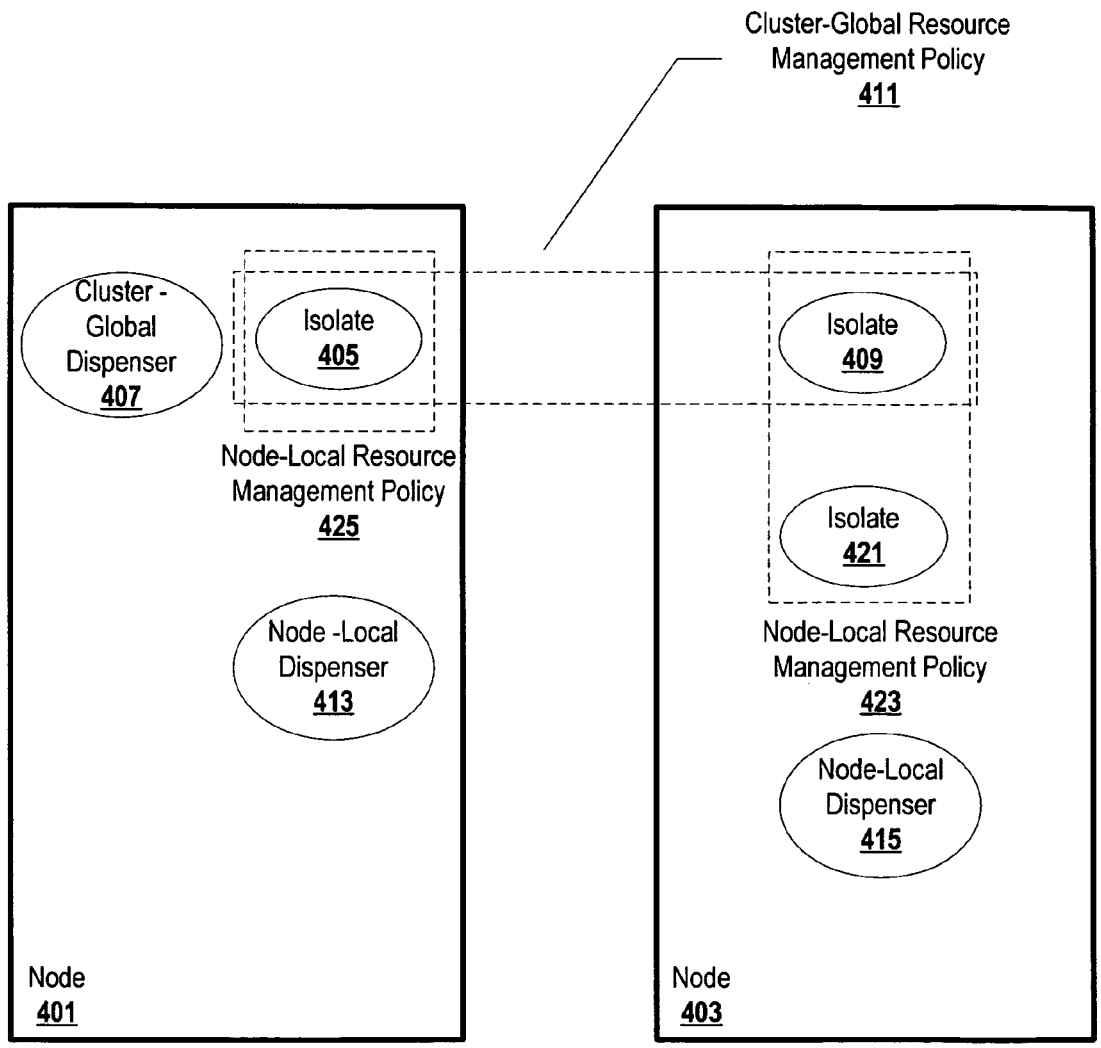
FIG. 4 depicts an exemplary dual view of a resource.

FIG. 4 depicts an exemplary dual view of a resource. A node 401 hosts a cluster-global dispenser 407, a consume isolate 405, and a node-local dispenser 413. The isolate 405 is bound to a cluster-global resource management policy 411 and a node-local resource management policy 425. Node 403 hosts an isolate 409 and an isolate 421, and a node-local dispenser 415. Both of the isolates 409 and 421 are bound to a node-local resource management policy. The node 409 is also bound to the cluster-global resource management policy. The policies 411, 425, and 423 are for the same resource, which is exposed two different ways. The node local policies 425 and 423 govern the node-local expressions of a resource at the aggregates 401 and 403, respectively. The cluster-global resource management policy 411 governs the cluster-global exposure of the resource. The cluster-global dispenser 407 is associated with the cluster-global resource management policy 411. The node-local dispensers 413 and 415 are respectively associated with the node-local resource management policies 425 and 423.

The implementation of the resource (e.g., classes in java.net) on each aggregate (i.e., node) 401 and 403, transparently consults both dispensers upon request for the resource. The node-local dispensers 413 and 415 have information about consumption on their respective aggregates 401 and 403, while the cluster-global dispenser 407 has a combined view of resource consumption on all the aggregates 401 and 403, but does not distinguish between individual aggregates.

This mechanism enables both node-local and cluster-global control over a given resource. The policies may, but do not have to, coordinate. For example, the node-local policy may express "no more than 64 MB for any isolate," while the cluster-global policy may control memory allotments to groups of isolates expressing "no application, regardless of how many nodes its components execute on, should get more than 1 GB of heap memory." Thus, each isolate would be controlled by both policies, and any request for the resource would be granted only if both policies agree. This dual-view of a resource facilitates writing policies that apply both to the whole cluster as well as within the confines of a single node.

The following example illustrates control over a resource that can be expressed with a node-local policy and a cluster-global policy as applied to two different isolates, 405 and 409. The resource governed is outgoing network traffic. Isolate 405 is allowed to consume up to 4 MB/s of the resource, and its usage varies over time. Isolate 409 continually tries to send out as much data as possible. The consumption by isolate 409 is subject to two policies: (i) the node-local policy 423, which states that an isolate bound to the node-local policy 423 cannot send more than 4 MB/s of network traffic, and (ii) the cluster-global policy 411, which ties the isolate's 409 allowed rate to the isolate's 405 consumption, and expresses that the sum of the consumption rates by both isolates 405 and 409 cannot exceed 5 MB/s. For example, when the consumption rate by the isolate 405 is 0.5 MB, the cluster-global dispenser 407 will cap usage by the isolate 409 at 4.5 MB/s in accordance with the cluster-global policy 411, which is more than the limit enforced by the node-local policy 423. Thus, isolate 409 will be allowed 4 MB/s. When usage by the isolate 405 of the network rises to 3 MB/s the cluster-global dispenser 407 will determine a new limit value of 2 MB/s in accordance with the policy 411, lower than the one dictated by the node-local policy 423. Hence, the isolate 409 will be able to use only 2 MB/s. Finally, when the isolate 405 reaches 4 MB/s, the isolate 409 should be obtaining 1 MB/s. The following exemplary code sketch shows how constraining usage of network bandwidth by isolate 409 is orchestrated (wherein the isolate 405 is referred to as isolate V and the isolate 409 is referred to as isolate W):

```
iV = new isolate("tests.V", new String [ ]{ }, agg1);
iW = new isolate ("tests.W", new String [ ]{ }, agg2);
dL = ResourceDomain.newDomain(LOC_NET_OUT, agg2);
dG = ResourceDomain.newDomain(GLOB_NET_OUT);
dL.setConsumeAction(...constrain to no more than 4MB/s...);
dG.setConsumeAction(...constrain to no more than 5MB/s...)
dL.bind(iW);
dG.bind(iV);
```

The method arguments described above in the exemplary code are coded using pre-defined constraints that maintain rolling usage rates. It should be understood that the example is not meant to be limiting upon the invention, and that the described techniques can be applied to control and/or manage a variety of resources within various operating environments (from either or both of the node local and the cluster-global perspectives), and a myriad of relationships between nodes and/or isolates.

The illustration exemplifies that non-trivial fine-grained policies can be expressed with cluster-global resource management infrastructure and with dual-view of a resource. The required global and local behavior programmed in resource consumption policies can be accurately enforced. These and other scenarios can apply to other resources as well, either in separate policies, when only a single resource needs to be controlled, or in multi-resource policies.

It is important to note that explicit node-local and cluster-global policies act in conjunction with implicit physical local limits. For example, typically there is a finite number L of file descriptors available on any given node. A cluster-global policy applied to two mutually remote isolates that reserves 2L will guarantee that they together can use 2L, but will not guarantee that either of the isolates can individually obtain more than L descriptors.

To provide dual-view of a resource, a corresponding implementation of the resource can be annotated with consume/ unconsume calls. For example, a consume call for Cluster-GlobalNetworkTraffic is accompanied by a consume call for LocalNetworkTraffic (i.e., a code snippet for a first of the resource types will be duplicated for the counterpart resource type of the dual-view resource).

Combining Different Resource Types

The abstraction of a dispenser can also be used to combine resources with unrelated and different implementations into entities that appear to clients as any other resource. For example, disk traffic and network traffic can be combined into a resource FileSystemOrNetworkTraffic. This combination resource type can be employed to limit the amount of data an application can send out through an external device, whether it be to a storage device or a over a network. Combining different resource types allows resources with different functions and sources of manufacturing to be treated interchangeably, as well as making programming such situations more convenient. In addition, a combined resource type can be controlled as any other resource. To account for consumption of multiple different types of resources as a single resource, consumption of the individual different types of resources is combined (e.g., a domain representing the combined resource is charged with consumption of the constituent resources).

An exemplary implementation for combining resource types would define a resource domain for multiple different resource types, such as file system traffic and network traffic. Each time either one of these resources is consumed, the same resource domain is charged for the consumption. Assuming an isolate A is bound to a resource domain X for FileSystemOrNetworkTraffic, when the isolate A requests consumption of file system traffic (e.g., by writing to a file), the resource domain X is charged. When isolate A (or any other isolate bound to the resource domain X) consumes network traffic, its consumption is charged against resource domain X.

Figure 5A:
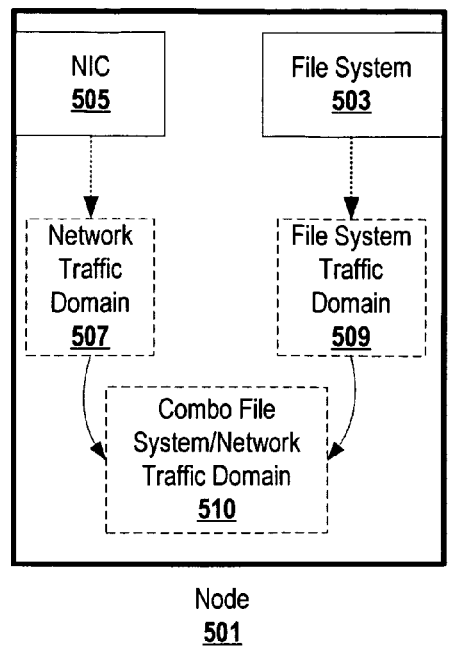
FIGS. 5A-5B depict exemplary systems with combination resources implemented with resource domains.
Figure 5B:
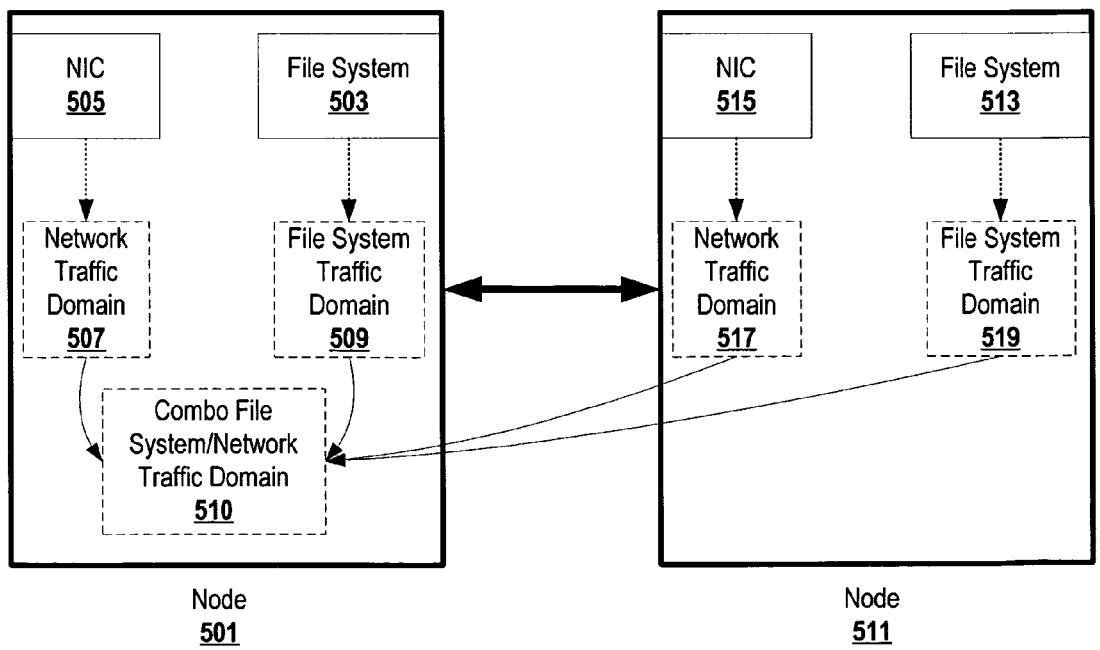

FIGS. 5A-5B depict exemplary systems with combination resources implemented with resource domains. FIG. 5A depicts an exemplary system with a combination resource domain. A node 501 includes a file system 503 and a network interface card (NIC) 505. Isolates that will utilize the NIC 505 and/or the file system 503 are respectively bound to a network traffic resource domain 507 and a file system traffic resource domain 509. Charges against either one of these domain 507 and 509 are also charged against a combination file system/ network traffic resource domain 10. When a dispenser resident on the node 501 handles resource requests for either network traffic or file system traffic, the corresponding resource domain is consulted, as well as the combination file system/network traffic resource domain 510. Although the above described example indicates defining and management of the individual resource types, a combination type resource may be defined and managed without defining or managing the resource types that comprise the combination type resource.

FIG. 5B depicts exemplary systems with a cluster-global resource domain for a combination resource. The node 501 hosts a cluster-global dispenser, although not illustrated. A node 511 is communicatively coupled with the node 501. The node 511 includes a network interface card (NIC) 515 and a file system 513. The node 511 also hosts a network traffic resource domain 517 and a file system traffic resource domain 519. Charges against either of the resource domains 517 or 519 are also charged against the cluster-global combination resource domain 510. Of course, each of the nodes 501 and 511 may host local instances of combination file system/ network traffic resource domains instead of a cluster-global domain. Requests for either network traffic or file system traffic resources would be directed to the appropriate corresponding one of the local resource domains 507 and 509, and directed to a local combination file system/network traffic resource domain resident on the node 501. Likewise, requests for either of network traffic or file system traffic on the node 511 would be directed to the appropriate corresponding one of the local resource domains 517 and 519, as well as a local combination file system/network traffic resource domain hosted on the node 511.

Furthermore, the previously discussed dual-view resources may be implemented with combination resource types. For example, the resource network traffic may be managed at a cluster-global scale with a cluster-global resource domain for network traffic, hosted on either o the nodes 501 or 511, while still allowing the individual nodes to locally manage their network traffic resource with their node-local network traffic resource domains 507 and 517. Likewise, the combination type resource for file system traffic and network traffic can also be managed with at a node-local scale by logically viewing it as two resources. Each of the nodes 501 and 511 would host respective node-local resource domains for the combination file system/network traffic resource. Hence, the two resources file system traffic and network traffic can be managed from 6 different perspectives for each node: 1) node-local network traffic, 2) node-local file system traffic, 3) cluster-global network traffic, 4) cluster-global file system traffic, 5) node-local combination file system/network traffic, and 6) cluster-global file system/network traffic.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 6:
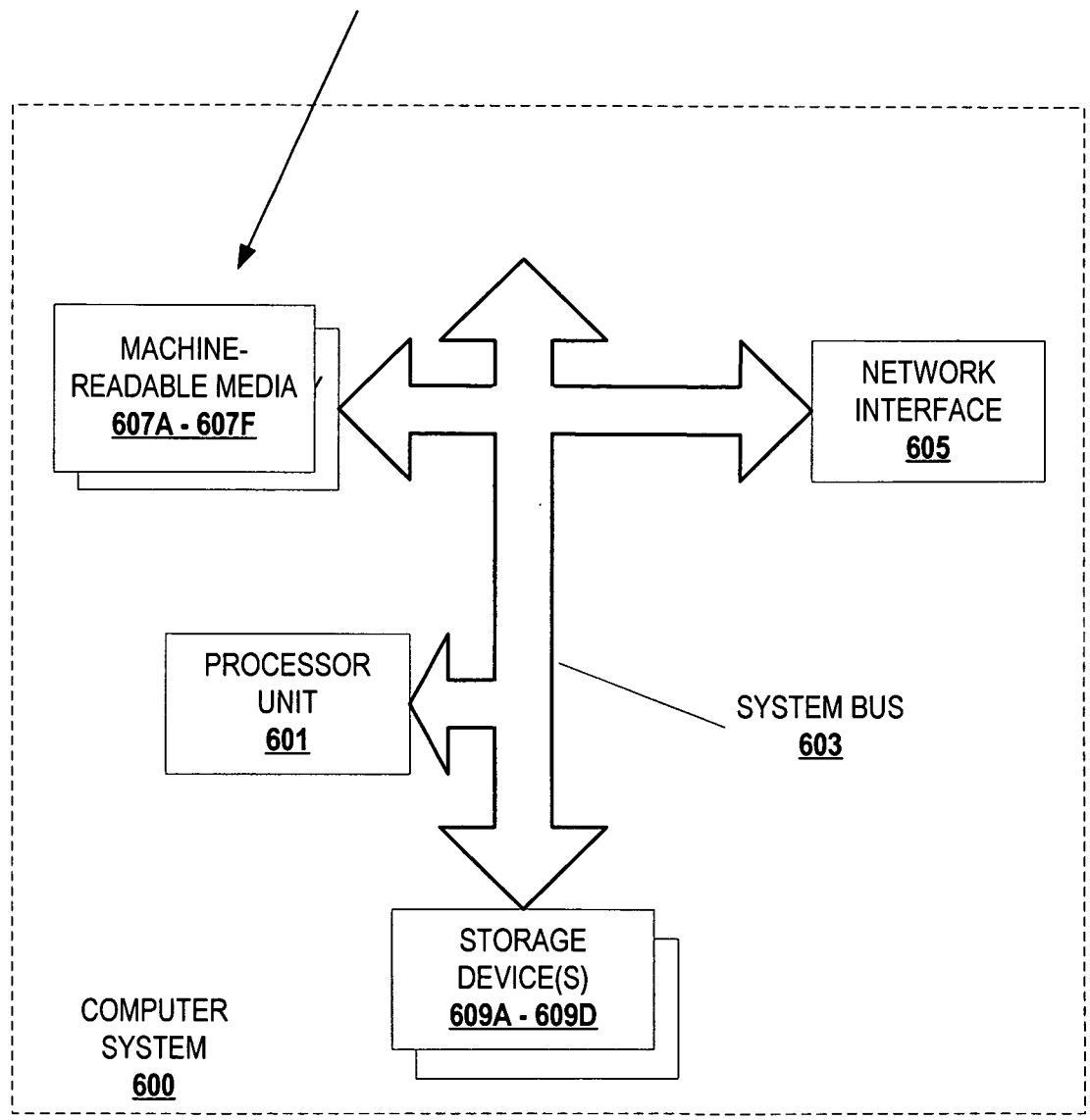
FIG. 6 depicts an exemplary computer system according to some realizations of the invention.

FIG. 6 depicts an exemplary computer system according to some realizations of the invention. A computer system 600 includes a processor unit 601 (possibly including multiple processors and/or implementing multi-threading). The computer system 600 includes a machine-readable media 607A-607F. The machine-readable media may be system memory (e.g., one or more of cache, SRAM DRAM, RDRAM, EDO RAM, DDR RAM, EEPROM, etc.) or any one or more of the above already described possible realizations of machine-readable media. The computer system 600 includes also a system bus 603 (e.g., LDT, PCI, ISA, etc.), a network interface 605 (e.g., an ATM interface, an Ethernet interface, a Frame Relay interface, etc.), and a storage device(s) 609A-609D (e.g., optical storage, magnetic storage, etc.). One or more of the machine-readable media 607A-607F embodies code for a resource management interface that defines a cluster-global dispenser, combination resource types, or cluster-global resource policies. The machine-readable media 609A-609D may also embody one or more class definitions for a combination resource domain. Realizations of the invention may include fewer or additional components not illustrated in FIG. 6 (e.g., video cards, audio cards, additional network interfaces, peripheral devices, etc.). The processor unit 601, the storage device(s) 609A-609D, and the network interface 605 are coupled to the system bus 603. The machine-readable media 607A-607F is either coupled directly or indirectly to the system bus 603.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of managing computer resources, the method comprising:
using a computer to perform:
managing usage of a plurality of measurable, consumable computer resource of different resource types as a single combination resource of a single combination resource type; and
combining a measure of consumption of each of the plurality of resource of different resource types into a single measure of aggregate consumption for the single combination resource of the single combination resource type, wherein the different resource types perform different functions.

2. The method of claim 1, wherein managing comprises applying a resource management policy against a consumption requests for any of the plurality of resource of different resource types.

3. The method of claim 1, wherein said combining comprises charging consumption of each of the plurality of resources of different resource types against the single combination resource.

4. The method of claim 1, wherein the managing comprises defining a resource domain for the single combination resource and applying resource management policies of the resource domain against requests for any of the plurality of resource of different resource types, wherein a resource domain encapsulates a usage policy for a resources.

5. The method of claim 4, wherein said combining comprises charging consumption of any of the plurality of resource of the different resource types against the defined resource domain.

6. The method of claim 1, wherein usage of the single combination resource is managed on a cluster-global scale.

7. The method of claim 6, further comprising managing usage of the single combination resource on a node-local scale in addition to managing it on a cluster-global scale.

8. A non-transitory machine-readable storage medium, storing:
program instructions that are computer-executable to implement a combination resource class that is instantiable to define a combination resource of a combination resource type, wherein the combination resource is a combination of measurable, consumable computer resources of different resource types, and wherein consumption of the combination resource is measured as a single measurement of aggregate consumption for the combination resource, wherein the different resource types perform different functions; and program instructions that are computer-executable to implement a resource domain class that is instantiable to define methods for associating different types of policies with an instantiated resource domain, wherein a resource domain encapsulates a usage policy for a resource, wherein the policies dictate limits on consumption of a combination resource of the combination resource type by one or more isolates that are bound to the instantiated resource domain, and wherein an isolate is a set of one or more computations that do not share computational state with other computations.

9. The storage medium of claim 8, wherein the resource domain class also defines methods for setting actions to express one or more resource management policies.

10. The storage medium of claim 9, wherein the methods for setting actions include methods for at least one of setting constraint actions, setting notification actions, and setting reservations.

11. The storage medium of claim 8, further storing program instructions that are computer-executable to implement a resource dispenser class that is instantiable to define methods for instantiating a resource dispense for a cluster of nodes and methods for associating an instantiated resource dispenser with an instantiated resource domain.

12. The storage medium of claim 8, wherein instances of the resource domain class further define methods for binding isolates to an instantiated resource domain, wherein an isolate is a set of one or more computations that do not share computational state with other computations.

13. A non-transitory machine-readable storage medium, storing:

a first sequence of instructions that is computer-executable to charge consumption of a resource of a first type of measurable, consumable computer resource against a resource domain; and a second sequence of instructions that is computer-executable to charge consumption of a resource of a second type of measurable, consumable computer resource against the resource domain;

wherein the resource domain encapsulates a usage policy for a single combination resource of a single combination resource type, wherein the single combination resource comprises the resource of the first type and the resource of the second type, and wherein consumption of the single combination resource is measured as a single measurement of aggregate consumption for the single combination resource, wherein the resource of the first type and the resource of the second type perform different functions.

14. The storage medium of claim 13, wherein the first sequence of instructions and the second sequence of instructions are distinct from sequences of instructions that implement instances of the first and second types of resources.

15. The storage medium of claim 13, wherein the first sequence of instructions comprises:

a first set of one or more instruction instances that is computer-executable to communicate a consume request to a resource dispenser; and a second set of one or more instruction instances that is computer-executable to express a resource management policy and to apply the expressed resource management policy to instances of the first and second types of resources.

16. The storage medium of claim 13, wherein the first and second sequences of instructions are distributed over different nodes within a cluster of nodes.

17. The storage medium of claim 13, further storing a third sequence of instructions that is computer-executable to aggregate accounting information for the first and second types of resources.

18. An apparatus, comprising:

memory; and means for managing usage of a plurality of measurable, consumable computer resources of different types as a single combination resource of a single combination resource type, wherein consumption of the single combination resource is measured as a single measurement of aggregate consumption for the combination resource, wherein the different resource types perform different functions.

19. The apparatus of claim 18, further comprising means for managing usage of resources of the single combination resource type over a cluster of nodes.

20. The apparatus of claim 18, further comprising means for applying one or more resource management policies to instances of the different types of resources by applying them to the single combination resource type.

21. The apparatus of claim 18, further comprising managing usage of the single combination resource type on both a node-local scale and a cluster-global scale.

* * * * *

UNITED STATES PATENT AND TRADEMARK OFFICE
CERTIFICATE OF CORRECTION

PATENT NO. : 8,973,008 B2
APPLICATION NO. : 11/125579
DATED : March 3, 2015
INVENTOR(S) : Czajkowski et al.

It is certified that error appears in the above-identified patent and that said Letters Patent is hereby corrected as shown below:

On the title page, item 56, column 2, under Other Publications, line 4, delete "Implemenation," and insert -- Implementation, --, therefor.

In the specification

In column 10, line 13, delete "mis-balanced" and insert -- misbalanced --, therefor.

In column 11, line 33, delete "SMB/s...)" and insert -- 5MB/s...) --, therefor.

In column 12, line 39, delete "domain 10." and insert -- domain 510. --, therefor.

In column 13, line 8, delete "o" and insert -- of --, therefor.

In the claims

In column 14, line 26, in Claim 1, delete "resource" insert -- resources --, therefor.

In column 14, line 30, in Claim 1, delete "resource" insert -- resources --, therefor.

In column 14, line 35, in Claim 2, after "wherein" insert -- said --.

In column 14, line 36, in Claim 2, after "against" delete "a".

In column 14, line 37, in Claim 2, delete "resource" insert -- resources --, therefor.

In column 14, line 43, in Claim 4, delete "wherein the" insert -- wherein said --, therefor.

In column 14, line 47, in Claim 4, delete "resource" insert -- resources --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 8,973,008 B2

In the claims

In column 14, line 48, in Claim 4, delete "resources." insert -- resource. --, therefor.

In column 14, line 51, in Claim 5, delete "resource" insert -- resources --, therefor.

In column 14, line 51, in Claim 5, after "of" delete "the".